(12) United States Patent
Schneiter

(10) Patent No.: US 11,271,234 B2
(45) Date of Patent: Mar. 8, 2022

(54) FUEL CELL WITH IMPROVED DURABILITY

(71) Applicant: BALLARD POWER SYSTEMS INC., Burnaby (CA)

(72) Inventor: Manuel Schneiter, Braunschweig (DE)

(73) Assignee: BALLARD POWER SYSTEMS INC., Burnaby (CA)

( * ) Notice: Subject to any disclaimer, the term of this patent is extended or adjusted under 35 U.S.C. 154(b) by 80 days.

(21) Appl. No.: 16/327,793

(22) PCT Filed: Aug. 10, 2017

(86) PCT No.: PCT/US2017/046377
§ 371 (c)(1),
(2) Date: Feb. 22, 2019

(87) PCT Pub. No.: WO2018/038931
PCT Pub. Date: Mar. 1, 2018

(65) Prior Publication Data
US 2019/0237789 A1 Aug. 1, 2019

Related U.S. Application Data

(60) Provisional application No. 62/380,297, filed on Aug. 26, 2016.

(51) Int. Cl.
*H01M 8/1018* (2016.01)
*H01M 8/0265* (2016.01)
(Continued)

(52) U.S. Cl.
CPC ....... *H01M 8/1018* (2013.01); *H01M 4/8636* (2013.01); *H01M 4/8663* (2013.01);
(Continued)

(58) Field of Classification Search
None
See application file for complete search history.

(56) References Cited

U.S. PATENT DOCUMENTS 6,020,083 A 2/2000 Breault et al.
6,057,054 A 5/2000 Barton et al.
(Continued)

FOREIGN PATENT DOCUMENTS

CN 108054406 A 5/2018
EP 0 604 683 B1 5/1999
(Continued)

OTHER PUBLICATIONS

Ahn, S-Y. et al., "Performance and Lifetime Analysis of the kW-Class PEMFC Stack," Journal of Power Sources 106:295-203, 2002.

*Primary Examiner* — Eugenia Wang
(74) *Attorney, Agent, or Firm* — Seed Intellectual Property Law Group LLP

(57) ABSTRACT

A solid polymer electrolyte fuel cell comprises a membrane electrode assembly comprising a polymer electrolyte disposed between an anode electrode and a cathode electrode, the anode and cathode electrodes each comprising a catalyst, a central region and a peripheral region, wherein the peripheral region of the cathode electrode comprises a cathode edge barrier layer; a fluid impermeable seal in contact with at least a portion of the anode and cathode peripheral regions and the cathode edge barrier layer; an anode flow field plate adjacent the anode electrode; and a cathode flow field plate adjacent the cathode electrode, wherein the cathode flow field separator plate comprises a cathode peripheral flow channel and at least one cathode central flow channel; wherein at least a portion of the cathode edge barrier layer traverses at least a portion of the cathode peripheral flow channel.

15 Claims, 3 Drawing Sheets

(51) Int. Cl.
*H01M 8/0284* (2016.01)
*H01M 8/0271* (2016.01)
*H01M 8/0276* (2016.01)
*H01M 4/86* (2006.01)
*H01M 8/1004* (2016.01)
*H01M 8/10* (2016.01)

(52) U.S. Cl.
CPC ....... *H01M 8/0265* (2013.01); *H01M 8/0271* (2013.01); *H01M 8/0276* (2013.01); *H01M 8/0284* (2013.01); *H01M 8/1004* (2013.01); *H01M 2008/1095* (2013.01)

(56) References Cited

U.S. PATENT DOCUMENTS

| | | | |
|---|---|---|---|
| 6,500,217 | B1 | 12/2002 | Starz et al. |
| 2001/0001052 | A1 | 5/2001 | Bonk et al. |
| 2002/0045046 | A1 | 4/2002 | Sasaki et al. |
| 2005/0014059 | A1 | 1/2005 | Kaye |
| 2005/0089746 | A1* | 4/2005 | James ................ H01M 8/0271 429/483 |
| 2005/0095494 | A1 | 5/2005 | Fuss et al. |
| 2010/0015487 | A1* | 1/2010 | Yoshimura .......... H01M 8/0263 429/494 |
| 2010/0209811 | A1 | 8/2010 | Barnwell et al. |
| 2011/0053029 | A1* | 3/2011 | Kim .................... H01M 8/0273 429/452 |
| 2011/0123898 | A1 | 5/2011 | Oda et al. |
| 2011/0244340 | A1* | 10/2011 | Cipollini ............ H01M 4/8605 429/409 |
| 2012/0164559 | A1* | 6/2012 | Darling ............... H01M 8/0204 429/514 |
| 2012/0258380 | A1* | 10/2012 | Takeguchi .......... H01M 8/1004 429/480 |
| 2013/0236808 | A1 | 9/2013 | Sugiura et al. |
| 2013/0252133 | A1 | 9/2013 | Yoshida et al. |
| 2016/0149232 | A1 | 5/2016 | Tanaka et al. |

FOREIGN PATENT DOCUMENTS

| | | |
|---|---|---|
| EP | 1 372 203 A1 | 12/2003 |
| EP | 2 195 873 | 4/2009 |
| JP | H07-201346 A | 8/1995 |
| JP | 11-204122 A | 7/1999 |
| JP | 2001-185175 A | 7/2001 |
| JP | 2005538508 A | 12/2005 |
| JP | 2007173225 A | 7/2007 |
| JP | 2008-177001 A | 7/2008 |
| JP | 2009-94046 A | 4/2009 |
| JP | 2009206075 A | 9/2009 |
| JP | 2009-230877 A | 10/2009 |
| JP | 2010-541151 A | 12/2010 |
| JP | 2011-90802 A | 5/2011 |
| JP | 2011-113785 A | 6/2011 |
| JP | 2013-12324 A | 1/2013 |
| JP | 2013-161741 A | 8/2013 |
| JP | 2015-115242 A | 6/2015 |
| JP | 2017-68956 A | 4/2017 |
| WO | 92/22096 A2 | 12/1992 |
| WO | 00/26975 A1 | 5/2000 |
| WO | 00/39862 A1 | 7/2000 |

* cited by examiner

FUEL CELL WITH IMPROVED DURABILITY

This application also claims the benefit of U.S. Provisional Patent Application No. 62/380,297, filed Aug. 26, 2016, and is incorporated herein by reference in its entirety.

BACKGROUND

Field of the Invention

The present invention relates to PEM fuel cells, and to membrane electrode assemblies having improved durability.

Description of the Related Art

Electrochemical fuel cells convert reactants, namely fuel and oxidant streams, to generate electric power and reaction products. Electrochemical fuel cells generally employ an electrolyte disposed between two electrodes namely a cathode and an anode. An electrocatalyst is needed to induce the desired electrochemical reactions at the electrodes. In addition to electrocatalyst, the electrodes may also comprise an electrically conductive substrate upon which the electrocatalyst is deposited. The electrocatalyst may be a metal black (namely, a substantively pure, unsupported, finely divided metal or metal powder) an alloy or a supported metal catalyst, for example, platinum on carbon particles.

A proton exchange membrane (PEM) fuel cell is a type of electrochemical fuel cell which employs a membrane electrode assembly ("MEA"). The MEA comprises a solid polymer electrolyte or ion-exchange membrane disposed between the cathode and anode. The ion-exchange membranes of particular interest are those prepared from fluoropolymers and which contain pendant sulfonic acid functional groups and/or carboxylic acid functional groups. A typical perfluorosulfonic acid/PTFE copolymer membrane can be obtained from DuPont Inc under the trade designation Nafion®.

Each electrode typically contains a catalyst layer, comprising an appropriate catalyst, located next to the solid polymer electrolyte. The catalyst is typically a precious metal composition (e.g., platinum metal black or an alloy thereof) and may be provided on a suitable support (e.g., fine platinum particles supported on a carbon black support). The catalyst layers may also contain ionomer. The electrodes may also contain a porous, electrically conductive substrate that may be employed for purposes of mechanical support, electrical conduction, and/or reactant distribution, thus serving as a fluid diffusion layer. The MEA may be manufactured, for example, by bonding an anode fluid diffusion electrode, an ion-exchange membrane and a cathode fluid diffusion electrode together under the application of heat and pressure. Another method involves coating the catalyst layers directly onto an ion-exchange membrane to form a catalyst coated membrane and then bonding fluid diffusion layers thereon.

Flow fields for directing reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell stack.

During normal operation of a PEM fuel cell, fuel is electrochemically oxidized at the anode catalyst, typically resulting in the generation of protons, electrons, and possibly other species depending on the fuel employed. The protons are conducted from the reaction sites at which they are generated, through the ion-exchange membrane, to electrochemically react with the oxidant at the cathode exhaust. The electrons travel through an external circuit providing useable power and then react with the protons and oxidant at the cathode catalyst to generate water reaction product.

A broad range of reactants can be used in PEM fuel cells and may be supplied in either gaseous or liquid form. For example, the oxidant stream may be substantially pure oxygen gas or a dilute oxygen stream such as air. The fuel may be, for example, substantially pure hydrogen gas, a gaseous hydrogen-containing reformate stream, or an aqueous liquid methanol mixture in a direct methanol fuel cell.

For a PEM fuel cell to be used commercially in either stationary or transportation applications, a sufficient lifetime is necessary. For example, 5,000 hour or longer operations may be routinely required.

As disclosed in U.S. Pat. No. 6,057,054, the sealant material used to seal the MEA may be a flow processable elastomer, such as, for example, a thermosetting liquid injection moldable compound (e.g., silicones, fluoroelastomers, fluorosilicones, ethylene propylene diene monomer (EPDM), and natural rubber).

However, as disclosed in U.S. Pat. Appl. Pub. No. 2005/0089746, the sealant material may not be chemically stable within the acidic, oxidative and reductive environment found in a fuel cell, particularly over the fuel cell lifetime. Specifically, when silicones are used as the sealant material, mobile siloxanes may migrate into the membrane where they may then be chemically oxidized to form silicon dioxide derivatives. This contamination may subsequently lead to internal fractures within the membrane and ultimate failure of the fuel cell. Without being bound by theory, the source of the mobile siloxanes may include leachable oligomers, volatile low molecular weight siloxanes and/or degradation products from the hydrolysis of silicone. In particular, degradation appears to be localized within the region of the MEA where the sealant material is in close proximity to the active area of the MEA.

To reduce or eliminate contamination of the membrane, '746 discloses interposing a barrier film between the ion-exchange membrane and the sealant material impregnated into the MEA, or impregnating a barrier plug into the fluid diffusion later adjacent to the sealant material impregnated into the MEA. However, siloxanes can still migrate around the barrier film or plug due to the presence or movement water and gas flux from the flow channel down to the catalyst, leading to membrane degradation.

Accordingly, there remains a need in the art to develop further improvements to mitigate or eliminate such degradation. The present invention helps fulfill this need and provides further related advantages.

BRIEF SUMMARY

In one embodiment, a solid polymer electrolyte fuel cell comprises a membrane electrode assembly comprising a polymer electrolyte disposed between an anode electrode and a cathode electrode, the anode and cathode electrodes each comprising a catalyst, a central region and a peripheral region, wherein the peripheral region of the cathode electrode comprises a cathode edge barrier layer; a fluid impermeable seal in contact with at least a portion of the anode and cathode peripheral regions and the cathode edge barrier layer; an anode flow field plate adjacent the anode electrode; and a cathode flow field plate adjacent the cathode electrode, wherein the cathode flow field separator plate comprises a cathode peripheral flow channel and at least one cathode central flow channel; wherein at least a portion of the cathode edge barrier layer traverses at least a portion of the cathode peripheral flow channel.

In some embodiments, the cathode peripheral flow channel is different from the at least one cathode central flow channel in at least one of cross-sectional width and height.

In further embodiments, the anode flow field plate comprises an anode peripheral flow channel and at least one anode central flow channel; wherein at least a portion of the anode edge barrier layer traverses at least a portion of the anode peripheral flow channel.

These and other aspects of the invention are evident upon reference the attached drawings and following detailed description.

DETAILED DESCRIPTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
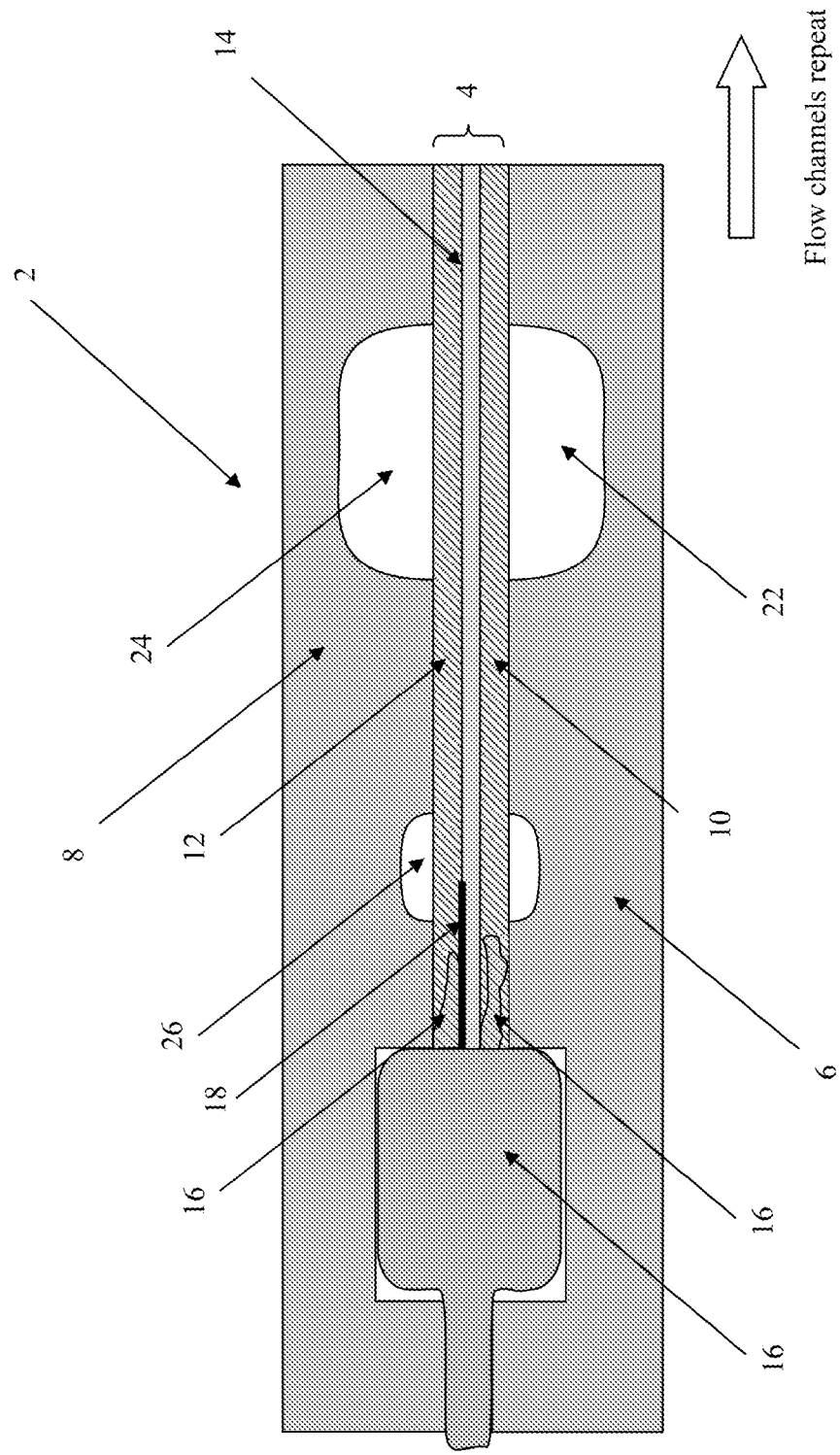
FIG. 1 is a cross-sectional diagram of an inlet region of an exemplary fuel cell according to one embodiment of the invention.

With reference to FIG. 1, fuel cell 2 includes a membrane electrode assembly 4 disposed between an anode flow field plate 6 and a cathode flow field plate 8.

Membrane electrode assembly 4 includes an anode electrode 10 and cathode electrode 12, with a polymer electrolyte membrane 14 disposed therebetween, as well as a fluid impermeable seal 16 that circumscribes MEA 4 and impregnates at least a portion of anode electrode 10 and cathode electrode 12 to seal the edge thereof. Cathode electrode 12 includes a cathode edge barrier layer 18 in a peripheral region thereof adjacent membrane 14. Anode electrode 10 and cathode electrode 12 include a catalyst for carrying out electrochemical reactions (hydrogen oxidation on the anode, oxygen reduction on the cathode) to produce electricity and product water. In one embodiment, cathode edge barrier layer 18 is in at least a portion of cathode electrode 12 in the peripheral region thereof. In another embodiment, cathode edge barrier layer 18 is between cathode electrode 12 and membrane 14. In either embodiment, the cathode edge barrier layer renders the peripheral region of the cathode electrode electrochemically inactive by substantially eliminating reactant access to the cathode peripheral region (i.e., substantially no water is produced in the peripheral region of the cathode).

Figure 2:
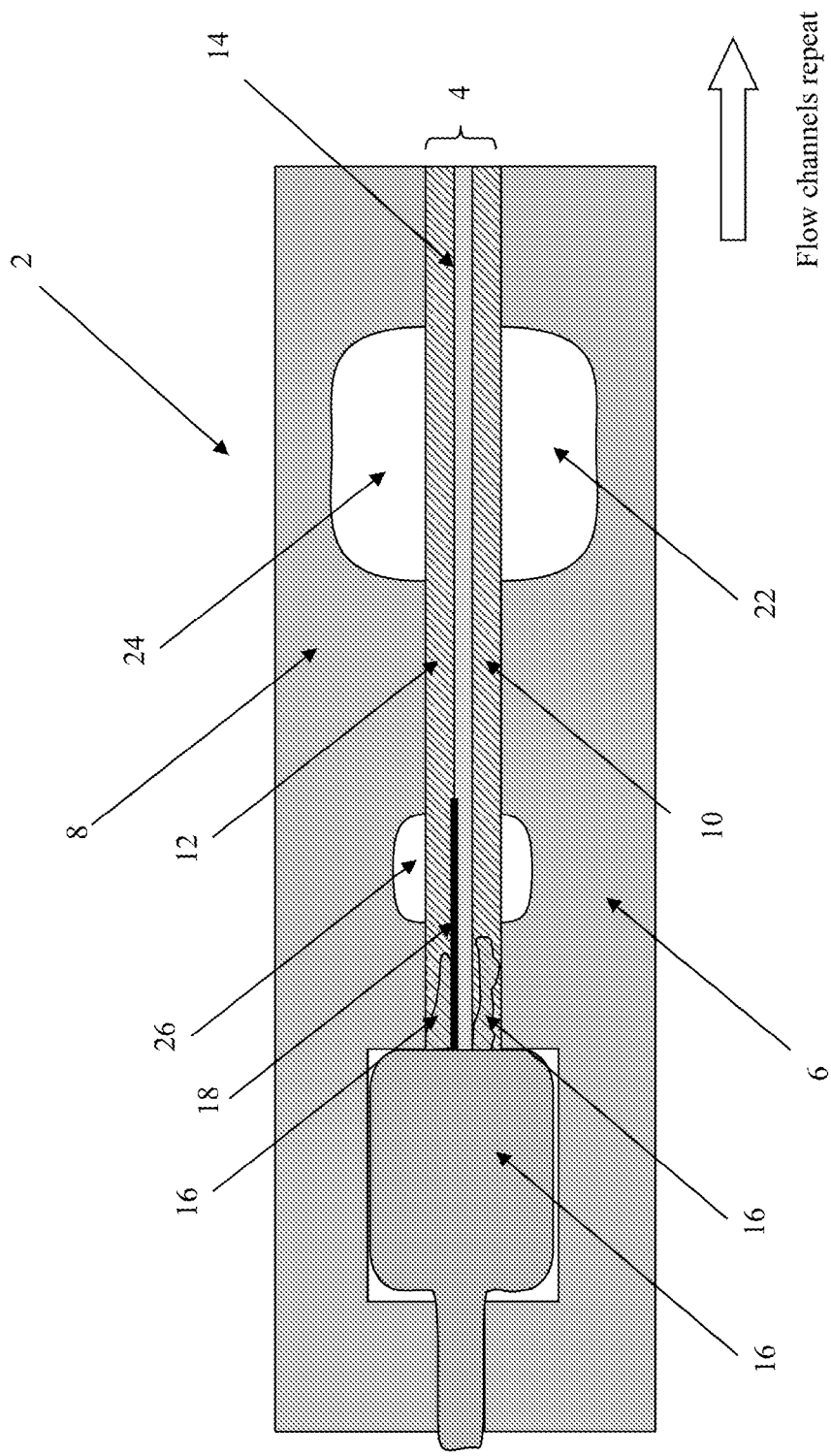
FIG. 2 is a cross-sectional diagram of an inlet region of an exemplary fuel cell according to another embodiment of the invention

Anode separator plate 6 and cathode separator plate 8 includes central flow channels 22, 24 that traverse or overlap a central region of anode electrode 10 and cathode electrode 12, respectively. Cathode edge barrier layer 18 extends to or at least partially traverses or overlaps cathode peripheral flow channel 26. In some embodiments, the cathode edge barrier layer traverses at least about 5% of the cathode peripheral flow channel to at least about 95% of the cathode peripheral flow channel. In specific embodiments, the cathode edge barrier layer traverses at least about 10% of the cathode peripheral flow channel to at least about 90%. In further embodiments, the cathode edge barrier layer traverses at least about 25% of the cathode peripheral flow channel to at least about 75% of the cathode peripheral flow channel. In yet further embodiments, the cathode edge barrier layer traverses at least about 50% of the cathode peripheral flow channel. In further embodiments, cathode edge barrier layer 18 traverses the entire width of cathode peripheral flow channel 26 (in other words, traverses at least about 100% of the cathode peripheral flow channel), as shown in FIG. 2. The central and peripheral flow channels should be connected to an inlet manifold and an outlet manifold (not shown).

Without being bound by theory, the inventor has discovered that during fuel cell operation, water accumulates under the seal landing and fills the seal groove area adjacent the peripheral flow channel because catalyst under the seal landing participates in the oxygen reduction reaction on the cathode and there is no significant water removal mechanism. The presence of water allows volatile oxidative species, such as OH— radicals, to remain in contact with the seal where they accelerate seal degradation. Once the seal has degraded, the presence of water also allows the soluble degradation products to migrate back to the membrane, thereby reducing membrane durability. However, by rendering the cathode peripheral region to be electrochemically inactive in at least a portion of the cathode peripheral flow channel area (e.g., the cathode edge barrier layer traverses a portion of the cathode peripheral flow channel, as shown in FIG. 1) or the entire peripheral flow channel area (e.g., the cathode edge barrier layer traverses the entire width of the cathode peripheral flow channel, as shown in FIG. 2) as well as under the seal landing by the use of a cathode edge barrier layer, water production in this region can be eliminated or reduced enough to make its removal possible through the cathode peripheral flow channel. In addition, the cathode peripheral flow channel can be used to remove any volatile oxidative species produced therein, thereby further reducing migration of volatile oxidative species to the membrane.

The cathode edge barrier layer should be substantially fluid impermeable and more stable to acid hydrolysis as compared to the sealant material. For example, if the sealant material is silicone, then the barrier layer may be a thermoplastic or a thermoset that is processable up to 500° C. and forms a physical barrier between sealant material 16 and membrane 16 (see for example Handbook of Plastics, Elastomers and Composites, 3rd edition, C. A. Harper ed., 1996, McGraw-Hill incorporated herein by reference in its entirety). Representative thermoplastics include polyvinylidene fluoride, polypropylene, polyethylene, polyolefins, polytetrafluoroethylene (PTFE), and aromatic thermoplastics such as polyaryl ethers, polyether ether ketones (PEEK), polysulfone etc. Representative thermosets include polyimide, epoxy, polyurethane, nitrile, butyl, thermoplastic elastomers (TPEs), etc.

In some embodiments, the peripheral region of the cathode electrode contains less catalyst than the central region of the cathode electrode. In further embodiments, the peripheral regions of the anode and cathode electrode contain substantially no catalyst.

In some embodiments, peripheral flow channel 26 may be the same or different in cross-sectional width, height and/or shape than central flow channels 24. As mentioned in the foregoing, the peripheral flow channels can be primarily used to remove volatile oxidative species and thus, do not need to be the same size or shape as the central flow channels. However, they can also be the same size as the central flow channels (not shown), particularly if the barrier layer only partially traverses the peripheral flow channels.

In some embodiments, peripheral flow channel 26 is a substantially straight channel that flows parallel to the length of membrane electrode assembly 4 while central flow channels 24 are not straight channels (not shown). In this embodiment, the edge barrier layer preferably extends or traverses the entire width of the peripheral flow channel so that the no electrochemical reactions take place therein. As a result, the peripheral flow channel does not need to be in the same orientation, size, or shape as the central flow channels so long as the peripheral flow channel is connected to an inlet manifold and an outlet manifold for removing volatile siloxanes and siloxane degradation products.

In some embodiments, the peripheral region of the anode and/or cathode electrode may further include an additive, such as, but not limited to, a radical scavenger, a membrane cross-linker, a hydrogen peroxide decomposition catalyst and a hydrogen peroxide stabilizer. Exemplary additives may include a manganese-based oxide, a cerium-based oxide, and a titanium-based oxide. Such additives in the peripheral region may help to further prevent membrane degradation. In some embodiments, the additives may extend beyond the peripheral region of the anode and cathode electrode and further into the central region of the anode and cathode electrode, particularly if the edge barrier layer only partially traverses the peripheral flow channel.

Figure 3:
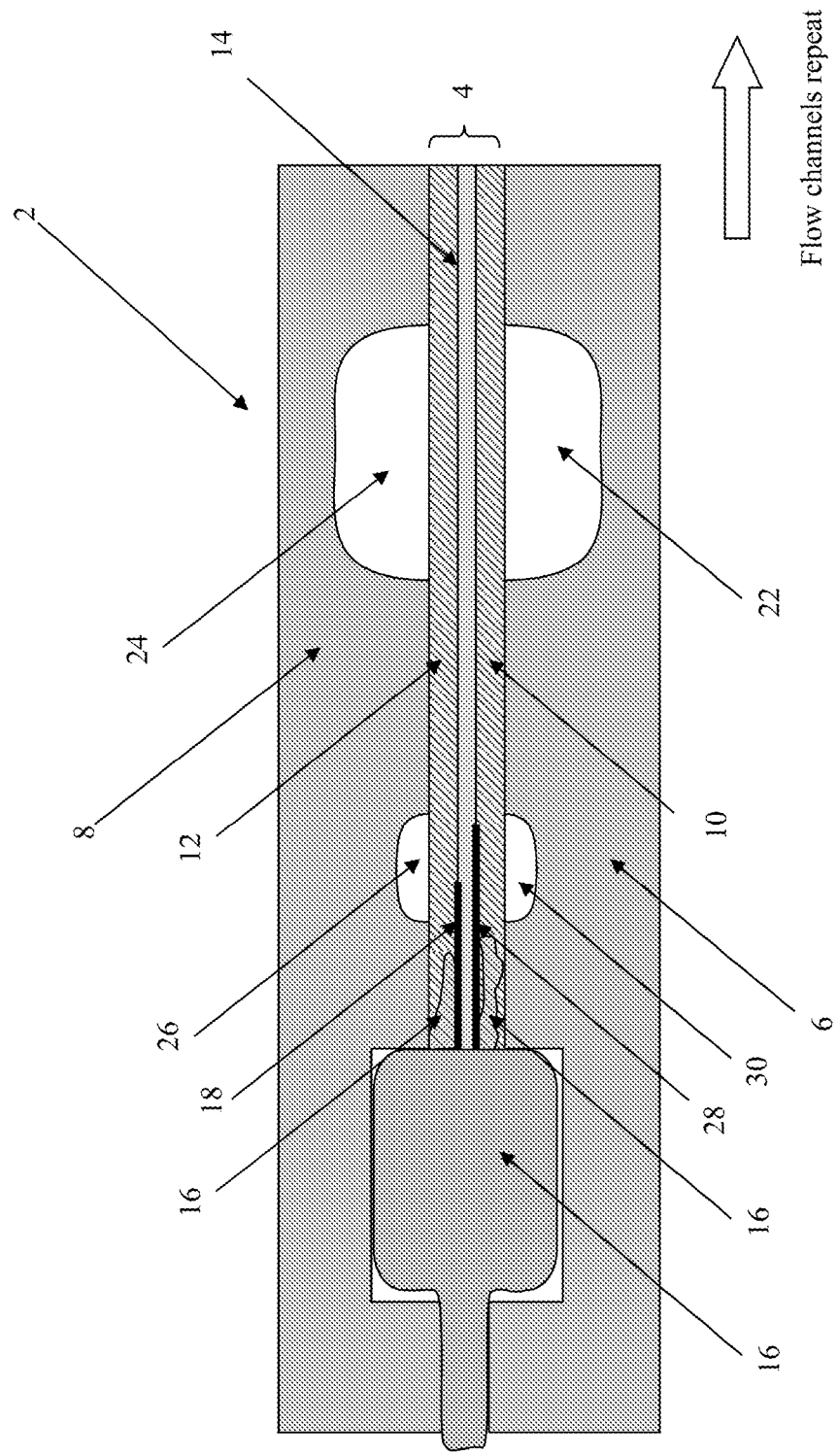
FIG. 3 is a cross-sectional diagram of an inlet region of an exemplary fuel cell according to yet another embodiment of the invention.

In another embodiment, the barrier layer is employed on the anode and cathode of MEA 4, as shown in FIG. 3. Anode edge barrier layer 28 may also traverse at least a portion of anode peripheral flow channel 30, and does not need to traverse the same distance as cathode edge barrier layer 18.

The cathode electrode may include a cathode gas diffusion layer and a cathode catalyst layer. In one embodiment, the cathode edge barrier layer may be a layer between the peripheral region of the cathode gas diffusion layer and the peripheral region of the cathode catalyst layer. In another embodiment, the cathode edge barrier layer may be impregnated into the peripheral region of the cathode gas diffusion layer and/or the peripheral region of the cathode catalyst layer. In either case, the cathode edge barrier layer prevents oxygen and/or protons from reaching the cathode catalyst layer and producing water electrochemically. Similarly, the anode edge barrier layer may be a layer between the peripheral region of the anode gas diffusion layer and the peripheral region of the anode catalyst layer, or may be impregnated into the peripheral region of the anode gas diffusion layer and/or the peripheral region of the anode catalyst layer.

The catalyst for the anode and cathode electrodes may be any suitable catalyst for hydrogen oxidation (anode) and oxygen reduction (cathode). For example, the catalyst may be a noble metal, such as platinum or platinum alloy, or a non-noble metal. The catalyst may be supported on a suitable support material, such as a carbonaceous or graphitic material, such as carbon black or graphite. The selection of catalyst is not essential, and will depend on the desired operating conditions of the fuel cell. Persons of ordinary skill in the art can readily select a suitable catalyst for a given application.

The flow field plate may be any suitable material. Exemplary examples include expanded graphite, carbon, and metallic materials. The selection of plate material is not essential, and will depend on the desired operating conditions of the fuel cell. Persons of ordinary skill in the art can readily select a suitable plate material for a given application The sealant material used to seal the MEA may be a flow processable elastomer, such as, for example, a thermosetting liquid injection moldable compound (e.g., silicones, fluoroelastomers, fluorosilicones, ethylene propylene diene monomer (EPDM), and natural rubber). Persons of ordinary skill in the art can readily select a suitable seal material for a given application.

While the present electrodes have been described for use in PEM fuel cells, it is anticipated that they would be useful in other fuel cells having an operating temperature below about 250° C. They are particularly suited for acid electrolyte fuel cells, including phosphoric acid, PEM and liquid feed fuel cells.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A solid polymer electrolyte fuel cell, comprising:
    a membrane electrode assembly comprising a polymer electrolyte disposed between an anode electrode and a cathode electrode, the anode and cathode electrodes each comprising a catalyst, a central region and a peripheral region, wherein the peripheral region and the central region of the cathode electrode comprise the catalyst and the peripheral region of the cathode electrode comprises a cathode edge barrier layer;
    a fluid impermeable seal in contact with at least a portion of the anode and cathode peripheral regions and the cathode edge barrier layer;
    an anode flow field plate adjacent the anode electrode; and
    a cathode flow field plate adjacent the cathode electrode, wherein the cathode flow field plate comprises a cathode peripheral flow channel and at least one cathode central flow channel;
    wherein at least a portion of the cathode edge barrier layer traverses at least a portion of the cathode peripheral flow channel and the portion of the cathode peripheral flow channel traverses at least a portion of the catalyst of the peripheral region of the cathode electrode.

2. The solid polymer electrolyte fuel cell of claim 1 wherein the cathode edge barrier layer renders the peripheral region of the cathode electrochemically inactive.

3. The solid polymer electrolyte fuel cell of claim 1 wherein the cathode edge barrier layer is in at least a portion of the cathode electrode.

4. The solid polymer electrolyte fuel cell of claim 1 wherein the cathode edge barrier layer is between the cathode electrode and the polymer electrolyte.

5. The solid polymer electrolyte fuel cell of claim 1 wherein the cathode edge barrier layer is fluid impermeable.

6. The solid polymer electrolyte fuel cell of claim 1 wherein the cathode edge barrier layer material is selected from the group consisting of polyvinylidene fluoride, polypropylene, polyethylene, polyolefins, polytetrafluoroethylene, polyaryl ethers, polyether ether ketones, polysulfone, polyimide, epoxy, polyurethane, nitrile, butyl, and thermoplastic elastomers.

7. The solid polymer electrolyte fuel cell of claim 1 wherein the peripheral region of the cathode comprises a lower amount of catalyst than the central region of the cathode.

8. The solid polymer electrolyte fuel cell of claim 1 wherein the peripheral region of at least one of the anode and cathode electrodes comprises at least one additive selected from the group consisting of a radical scavenger, a membrane cross-linker, a hydrogen peroxide decomposition catalyst and a hydrogen peroxide stabilizer.

9. The solid polymer electrolyte fuel cell of claim 1 wherein the peripheral region of at least one of the anode and cathode electrodes comprises at least one of manganese oxides, cerium oxides and titanium oxides.

10. The solid polymer electrolyte fuel cell claim 1 wherein the cathode peripheral flow channel and the cathode central flow channel each extend along a length of the membrane electrode assembly, and the cathode peripheral flow channel is different from the at least one cathode central flow channel in at least one of cross-sectional width and height.

11. The solid polymer electrolyte fuel cell claim 1 wherein the seal is a flow processable elastomer.

12. The solid polymer electrolyte fuel cell of claim 1 wherein the cathode electrode further comprises a cathode gas diffusion layer and a cathode catalyst layer and the cathode edge barrier layer is in at least a portion of at least one of a peripheral region of the cathode gas diffusion layer and a peripheral region of the cathode catalyst layer.

13. The solid polymer electrolyte fuel cell of claim 1 wherein the cathode electrode further comprises a cathode gas diffusion layer and a cathode catalyst layer and the cathode edge barrier layer is between a peripheral region of the cathode gas diffusion layer and a peripheral region of the cathode catalyst layer.

14. The solid polymer electrolyte fuel cell of claim 1, wherein:
 the anode flow field plate comprises an anode peripheral flow channel and at least one anode central flow channel;
 the peripheral region of the anode electrode comprises an anode edge barrier layer; and
 at least a portion of the anode edge barrier layer traverses at least a portion of the anode peripheral flow channel.

15. The solid polymer electrolyte fuel cell claim 14 wherein the anode peripheral flow channel is different from the at least one anode central flow channel in at least one of cross-sectional width and height.

* * * * *